United States Patent
Hyaku et al.

(10) Patent No.: US 11,622,175 B2
(45) Date of Patent: Apr. 4, 2023

(54) ELECTRONIC APPARATUS AND CONTROL METHOD THEREOF

(71) Applicant: CANON KABUSHIKI KAISHA, Tokyo (JP)

(72) Inventors: Bunho Hyaku, Ichikawa (JP); Yasufumi Oyama, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 199 days.

(21) Appl. No.: 16/871,409

(22) Filed: May 11, 2020

(65) Prior Publication Data
US 2020/0366836 A1 Nov. 19, 2020

(30) Foreign Application Priority Data
May 14, 2019 (JP) .............................. JP2019-091446

(51) Int. Cl.
| | |
|---|---|
| H04N 23/80 | (2023.01) |
| G06T 3/00 | (2006.01) |
| G06T 19/00 | (2011.01) |
| H04N 23/45 | (2023.01) |
| H04N 23/667 | (2023.01) |
| H04N 23/698 | (2023.01) |

(52) U.S. Cl.
CPC ........... *H04N 23/80* (2023.01); *G06T 3/0062* (2013.01); *G06T 19/006* (2013.01); *H04N 23/45* (2023.01); *H04N 23/667* (2023.01); *H04N 23/698* (2023.01)

(58) Field of Classification Search
CPC ............. H04N 5/23245; H04N 5/2258; H04N 5/23238; H04N 5/23229; G06T 3/0062; G06T 19/006
See application file for complete search history.

(56) References Cited

U.S. PATENT DOCUMENTS

| | | | |
|---|---|---|---|
| 9,344,704 B2* | 5/2016 | Lee | H04N 21/4147 |
| 9,538,085 B2* | 1/2017 | Choi | H04N 23/698 |

(Continued)

FOREIGN PATENT DOCUMENTS

| | | |
|---|---|---|
| CN | 1964459 A | 5/2007 |
| CN | 103888666 A | 6/2014 |

(Continued)

OTHER PUBLICATIONS

The above foreign documents were cited in a Dec. 21, 2021 Chinese Office Action, which is enclosed with an English Translation, that issued in Chinese Patent Application No. 202010407325.7.

(Continued)

*Primary Examiner* — John Villecco
(74) *Attorney, Agent, or Firm* — Cowan, Liebowitz & Latman, P.C.

(57) ABSTRACT

An electronic apparatus according to the present invention, includes at least one memory and at least one processor which function as: an acquisition unit configured to acquire a captured image; and a control unit configured to control so as to extract a partial range of an image acquired by the acquisition unit and record a still image that is not a VR image in a storage, and control so as to record a moving image that is a VR image in the storage based on the acquired image.

18 Claims, 9 Drawing Sheets

(56) References Cited

U.S. PATENT DOCUMENTS

| | | | |
|---|---|---|---|
| 9,591,241 B2* | 3/2017 | Konno | G02B 27/0018 |
| 9,632,314 B2* | 4/2017 | Cho | G02B 27/017 |
| 10,126,813 B2* | 11/2018 | Rainisto | G06F 3/013 |
| 10,725,723 B2* | 7/2020 | Murakami | G06F 3/1454 |
| 10,893,216 B2* | 1/2021 | Oyama | H04N 5/2252 |
| 11,277,567 B2* | 3/2022 | Shoda | H04N 5/23229 |
| 2010/0045773 A1* | 2/2010 | Ritchey | H04N 5/23238 348/E7.001 |
| 2010/0182443 A1 | 7/2010 | Tsujimura et al. | |
| 2013/0070091 A1* | 3/2013 | Mojaver | G02B 26/10 348/169 |
| 2013/0135428 A1* | 5/2013 | Choi | H04N 23/698 348/E7.001 |
| 2014/0071227 A1* | 3/2014 | Takenaka | H04N 23/698 382/284 |
| 2015/0309310 A1* | 10/2015 | Cho | G06F 3/0482 348/158 |
| 2015/0312496 A1* | 10/2015 | Konno | G03B 35/08 348/250 |
| 2015/0331242 A1* | 11/2015 | Cho | G02B 27/017 345/8 |
| 2016/0246456 A1* | 8/2016 | Murakami | G06F 3/04845 |
| 2017/0085861 A1* | 3/2017 | Rainisto | G06F 3/017 |
| 2017/0195565 A1* | 7/2017 | Ollier | G02B 13/005 |
| 2017/0195568 A1* | 7/2017 | Leizerovich, Jr. | H02J 7/0045 |
| 2018/0184000 A1 | 6/2018 | Lee et al. | |
| 2019/0007609 A1 | 1/2019 | Isobe | |
| 2019/0208142 A1* | 7/2019 | Kitaya | H04N 5/23245 |
| 2019/0230283 A1* | 7/2019 | Ollier | H04N 5/2258 |
| 2020/0213520 A1* | 7/2020 | Shoda | H04N 5/76 |
| 2020/0366837 A1* | 11/2020 | Hyaku | G06T 19/006 |
| 2020/0366839 A1* | 11/2020 | Kawasaki | H04N 5/23238 |

FOREIGN PATENT DOCUMENTS

| | | | | |
|---|---|---|---|---|
| CN | 106485653 A | * | 3/2017 | G06T 3/0012 |
| CN | 106646880 A | | 5/2017 | |
| JP | 2012-182730 A | | 9/2012 | |
| JP | 2015-115778 A | | 6/2015 | |
| JP | 2020039012 A | * | 3/2020 | |
| KR | 20080078130 A | * | 8/2008 | |
| KR | 20140110684 A | * | 9/2014 | |
| KR | 20170109297 A | * | 9/2017 | |

OTHER PUBLICATIONS

The above patent document was cited in a European Search Report dated Sep. 17, 2020, which is enclosed, that issued in the corresponding European Patent Application No. 20174338.2.

The above document was cited in a Sep. 7, 2022 Chinese Office Action, which is enclosed with an English Translation, that issued in Chinese Patent Application No. 202010407325.7.

The above patent documents were cited in a European Office Action dated Aug. 18, 2022, which is enclosed, that issued in the corresponding European Patent Application No. 20174338.2.

* cited by examiner

ELECTRONIC APPARATUS AND CONTROL METHOD THEREOF

BACKGROUND OF THE INVENTION

Field of the Invention

The present invention relates to an electronic apparatus, a control method thereof, a program, and a storage medium. In particular, the present invention relates to a method for capturing a moving image and a still image.

Description of the Related Art

There has been known an imaging apparatus capable of capturing a VR image having a wide field of view of, for example, 180 degrees or 360 degrees, which is wider than a normal field angle (Japanese Patent Application Publication No. 2015-115778). There has also been known an imaging apparatus capable of capturing still images and moving images at various timings (Japanese Patent Application Publication No. 2012-182730).

There are cases where a user wishes to capture both a VR image and an image with a normal field angle. However, in such a case, the user needs to use both an imaging apparatus capable of capturing VR images and an imaging apparatus capable of capturing images with a normal field angle. This is inconvenient for the user. Also, the user could miss a photo opportunity if taking too much time to switch between the two imaging apparatuses.

SUMMARY OF THE INVENTION

The present invention provides an electronic apparatus that enables capturing of both a VR image and an image with a normal field angle.

An electronic apparatus according to the present invention, includes at least one memory and at least one processor which function as: an acquisition unit configured to acquire a captured image; and a control unit configured to control so as to extract a partial range of an image acquired by the acquisition unit and record a still image that is not a VR image in a storage, and control so as to record a moving image that is a VR image in the storage based on the acquired image.

Further features of the present invention will become apparent from the following description of exemplary embodiments with reference to the attached drawings.

DESCRIPTION OF THE EMBODIMENTS

Figure 1A:
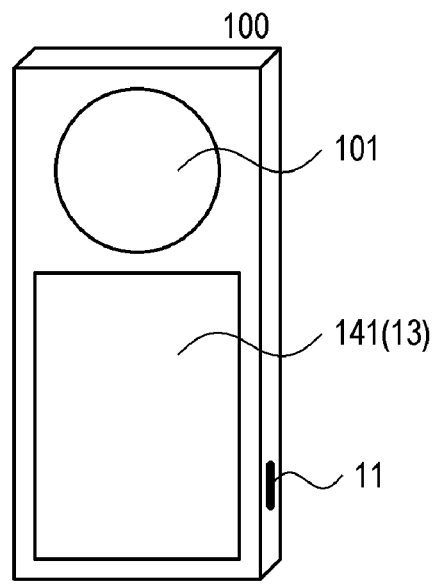
FIGS. 1A and 1B illustrate external views of an imaging apparatus according to the present embodiment.
Figure 1B:
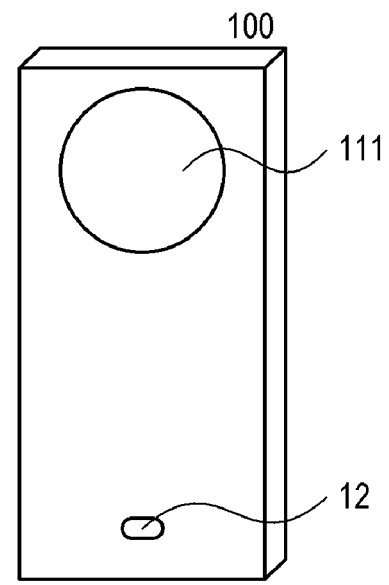

Hereinafter, a preferred embodiment of the present invention will be described with reference to the drawings. FIGS. 1A and 1B illustrate external views of an imaging apparatus 100 as an example of an electronic apparatus to which the present invention is applicable. The imaging apparatus 100 is a lens-integrated digital camera. The imaging apparatus 100 may as well be a single-lens reflex camera or a mirrorless single-lens camera.

FIG. 1A illustrates an external view of a front face of the imaging apparatus 100. A display 141 displays various kinds of images and various kinds of information. The imaging apparatus 100 can cause the display 141 to perform a live-view display (a display of a live-view image in which an object is displayed in almost real time) (display control). In addition, the user can issue various instructions related to imaging capturing (various operations related to image capturing) while checking the object with the live-view display on the display 141. A touch panel 13 provided on a display surface of the display 141 can receive touch operations. A release button 11 is a switch that can be half-pressed or fully-pressed. The user can issue at least one of an instruction to prepare for image capturing, an instruction to start moving-image capturing, an instruction to end moving-image capturing, an instruction to capture a still image, etc. by half-pressing or fully-pressing the release button 11. A lens 101 is a wide-angle lens and forms an image of a luminous flux incident into the lens 101 on an image sensor 102 (not illustrated in FIG. 1A).

FIG. 1B illustrates an external view of a rare face of the imaging apparatus 100. The user can issue at least one of an instruction to prepare for image capturing, an instruction to start moving-image capturing, an instruction to end moving-image capturing, an instruction to capture a still image, etc. by pressing a button 12 or releasing a finger pressing the button 12 therefrom. The lens 111 is a wide-angle lens similar to the lens 101 and forms an image of a luminous flux incident into the lens 111 on an image sensor 112 (not illustrated in FIG. 1B).

Alternatively, the display 141 may be a separate device (an external device such as a smartphone or a tablet terminal connected to the imaging apparatus 100 by wire or wirelessly) from the imaging apparatus 100. For example, the display 141 may be mounted on a smartphone or the like, which is a separate body from the imaging apparatus 100. In this case, since the imaging apparatus 100 can cause the external device to perform a live-view display, the user can issue the various instructions related to image capturing while checking an object on the live-view display of the external device. In addition, an operation to issue the various instructions related to image capturing may be performed by using the separate device from the imaging apparatus 100. For example, the user may perform the operation on a smartphone, which is a separate body from the imaging apparatus 100, and the smartphone may issue an instruction corresponding to this operation to the imaging apparatus 100.

Figure 2:
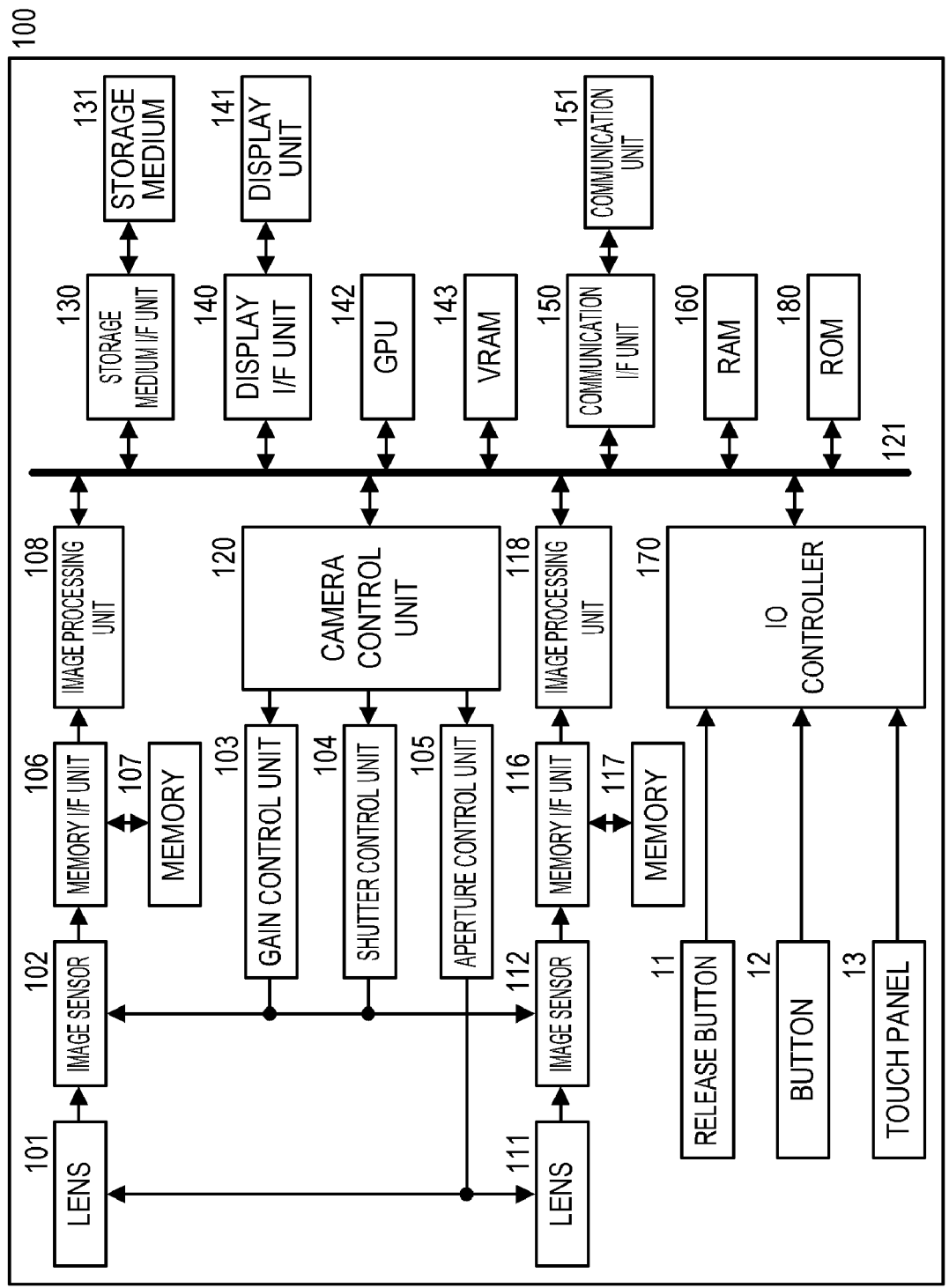
FIG. 2 is a block diagram illustrating an internal configuration of the imaging apparatus according to the present embodiment.

FIG. 2 illustrates an internal configuration of the imaging apparatus 100. While FIG. 2 separately illustrates each function as a constituent element, each function may be realized by hardware such as a single or a plurality of ASICs or programmable logic arrays (PLAs). Alternatively, each function may be realized by a programmable processor such as a CPU or an MPU that executes software.

The lens 101 is a single focus lens including an aperture mechanism, and the focal position of the lens 101 is set to obtain deep focus. However, the lens 101 is not necessarily be a single focus lens.

The image sensor 102 includes a CCD element and a CMOS element and has a configuration in which a plurality of pixels including a photoelectric conversion element is two-dimensionally arranged. The image sensor 102 photoelectrically converts an object image (optical image) formed by an imaging optical system including the lens 101 per pixel. Namely, the image sensor 102 captures an image, generates an analog signal of the image, converts the generated analog signal into a digital signal by an A/D conversion circuit, and outputs the image data on a pixel basis.

A memory I/F unit 106 writes image data for all the pixels output from the image sensor 102 into memory 107. In addition, the memory I/F unit 106 reads out image data held in the memory 107 and outputs the read-out image data to an image processing unit 108. The memory 107 is a volatile storage medium storing image data for several frames (each frame includes image data for all the pixels).

The image processing unit 108 performs processing such as gamma correction, color separation, and color difference matrix on image data (image data for all the pixels) from the memory I/F unit 106, adds a synchronization signal to the image data, and outputs the image data as video data for recording or display. In addition, the image processing unit 108 obtains a photometric value from a luminance value of each pixel of the image data that is input to the image processing unit 108 and provides the photometric value to a camera control unit 120 via a bus 121.

The lens 111, the image sensor 112, a memory I/F unit 116, memory 117, and an image processing unit 118 have functions similar to those of the lens 101, the image sensor 102, the memory I/F unit 106, the memory 107, and the image processing unit 108, respectively. The lens 111, the image sensor 112, the memory I/F unit 116, the memory 117, and the image processing unit 118 perform processing similar to that performed by the lens 101, the image sensor 102, the memory I/F unit 106, the memory 107, and the image processing unit 108, respectively.

The camera control unit 120 is configured by a CPU or the like and controls the entire operation of the imaging apparatus 100. A RAM 160 is used as a work area (work memory) of the camera control unit 120. In the RAM 160, constants and variables to be used for the operation of the camera control unit 120 are recorded, and a program, etc. are expanded. A ROM 180 stores a computer program or the like for operating the camera control unit 120. For example, the camera control unit 120 controls the entire operation of the imaging apparatus 100 by expanding the computer program stored in the ROM 180 in the RAM 160 and executing the computer program.

A gain control unit 103, a shutter control unit 104, and an aperture control unit 105 are used for exposure control. The camera control unit 120 controls the above control units 103 to 105 based on photometric values provided from the image processing unit 108 and the image processing unit 118 or an operation parameter manually set by the user. The gain control unit 103 controls gain of the image sensor 102 and the image sensor 112. The shutter control unit 104 controls shutter speed of the image sensor 102 and the image sensor 112. The aperture control unit 105 controls aperture mechanisms of the lens 101 and the lens 111.

A storage medium I/F unit 130 is an interface for connecting a storage medium 131 to the imaging apparatus 100. The storage medium I/F unit 130 records video data that is input from the image processing unit 108, the image processing unit 118, and a GPU 142 in the storage medium 131 and reads out the recorded video data from the storage medium 131. The storage medium 131 is a storage unit configured by a semiconductor memory or the like.

The display I/F unit 140 outputs video data from the image processing unit 108 and the image processing unit 118 and image data rendered in a video RAM (VRAM) 143 by the GPU 142 to the display 141.

The GPU 142 is a rendering engine that renders, based on an instruction from the camera control unit 120, video data output from the image processing unit 108 and the image processing unit 118 in the VRAM 143 by performing image conversion processing as well as image cut-out processing, enlargement processing, distortion correction, etc. In addition, the GPU 142 performs processing for rendering various kinds of information about the imaging apparatus 100 and a menu screen in the VRAM 143 in a superimposed manner. For example, touch-panel buttons for receiving various instructions from the user are rendered as a graphic user interface (GUI) by the GPU 142 and displayed on the display 141 via the display I/F unit 140.

A communication I/F unit 150 connects to a smartphone, a PC, and the like (not illustrated) located outside the imaging apparatus 100 via a communication unit 151 and transfers image data displayed on the display 141 thereto. In addition, the communication I/F unit 150 receives a control command, etc. to the imaging apparatus 100 from a smartphone, a PC, and the like and notifies the camera control unit 120 of the received control command, etc. The communication unit 151 is a wireless LAN interface for performing wireless communication and performs hardware processing on communication performed by the communication I/F unit 150.

The release button 11, the button 12, and the touch panel 13 have functions described above and output operation information corresponding to an operation (an instruction to prepare for image capturing, an instruction to start moving-image capturing, an instruction to end moving-image capturing, an instruction to capture a still image, etc.) to an IO controller 170. The IO controller 170 outputs the operation information from the various operational units to the camera control unit 120, and the camera control unit 120 performs processing that corresponds to the operation information received from the IO controller 170. For example, the touch panel 13 is superimposed on the display 141 and outputs operation information including coordinate information about a position and a region where a touch operation is performed.

Figure 3:
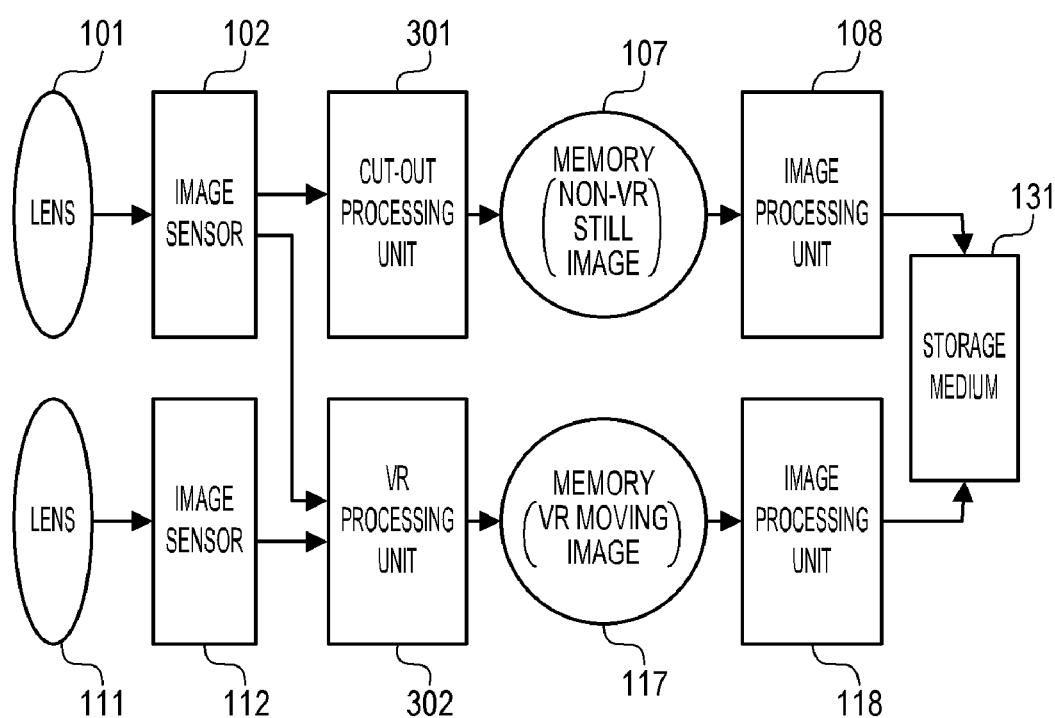
FIG. 3 is a block diagram illustrating an internal configuration of the imaging apparatus according to the present embodiment.

FIG. 3 illustrates an internal configuration of the imaging apparatus 100. FIG. 3 illustrates the configuration in a simplified manner so that characteristic processing of the present embodiment can be represented. Processing performed by a cut-out processing unit 301 and a VR processing unit 302 is realized by, for example, at least one constituent element including the camera control unit 120 in FIG. 2.

The cut-out processing unit 301 is used to generate a still image that is not a virtual reality (VR) image (non-VR still image). The VR image will be described below. The cut-out processing unit 301 acquires an image (image data output from the image sensor 102) captured by the image sensor 102. The cut-out processing unit 301 performs cut-out processing for extracting at least a partial range of the acquired image. The cut-out processing unit 301 stores the extracted range of the image (non-VR still image; image data) in the memory 107 (still image buffering). The image processing unit 108 performs compression encoding processing on the still image stored in the memory 107 and records the still image (non-VR still image) obtained by the compression encoding processing in the storage medium 131.

The range to be extracted in the cut-out processing may be a predetermined range such as a central portion (central part) of a range of the image captured by the image sensor 102 or may be a different range. Since the image captured by the image sensor 102 sometimes has distortion, the cut-out processing may include distortion correction to reduce the distortion of the image. By performing the distortion correction, the image with little distortion can be displayed or recorded. Alternatively, a non-VR still image may be recorded in the storage medium 131 by extracting a partial range of an image captured by the image sensor 112.

The VR processing unit 302 is used to capture a moving image which is a VR image (VR moving image). The VR processing unit 302 acquires an image captured by the image sensor 102 and an image captured by the image sensor 112 and performs VR processing by using these two images. The VR processing is not performed when a non-VR still image is captured.

The VR processing is image processing performed on an image captured so as to process the image to be treated as a VR image (an image in a VR format). For example, the VR processing is image processing for obtaining an image in a celestial-sphere format (celestial-sphere image format). In the present embodiment, the VR processing unit 302 performs the following processing in the VR processing. First, by using one of the two images as a reference image and the other as a comparison image, the VR processing unit 302 calculates an amount of deviation between the reference image and the comparison image per area by pattern matching processing and detects a connection position at which the two images are connected, based on the amount of the deviation per area. Next, taking the detected connection position and lens characteristics of each optical system into consideration, the VR processing unit 302 corrects distortion of each image by performing geometric conversion. In this way, each of the images is converted into an image in the celestial-sphere format. Next, the VR processing unit 302 generates a single image in the celestial-sphere format by synthesizing (blending) the two images in the celestial-sphere format. The image (VR image) obtained by the VR processing is an image using equidistant cylindrical projection, for example. Namely, an individual direction from a position (imaging position) at which the image is captured can be associated with an individual position (an individual pixel) in the image. In the present embodiment, each of the image sensors 102 and 112 captures an image that corresponds to a field angle of 180 degrees. Next, by performing the VR processing, a 360-degree image (an omnidirectional image; a celestial-sphere image) that corresponds to a field angle of 360 degrees is obtained from the two images captured by the two image sensors 102 and 112. The above synthesis may be performed when a VR image is VR-displayed (which will be described below), separately from the VR processing. In addition, a 180-degree image (a half-celestial-sphere image) may be generated by cutting out an arbitrary range corresponding to a field angle of 180 degrees from the 360-degree image.

The VR processing unit 302 stores the VR image obtained by the VR processing in the memory 117 so that the VR moving image is temporarily stored in the memory 107 (moving-image buffering). The image processing unit 118 performs compression encoding processing on the moving image stored in the memory 117 and records the moving image (VR moving image) obtained by the compression encoding processing in the storage medium 131. For example, the image processing unit 118 records an image file of the VR moving image in the storage medium 131 with VR information. The VR information is information for associating an individual direction from an imaging position with an individual position in the image. For example, the VR information includes at least one of information indicating a position (pixel) that corresponds to a zenith direction, information indicating a position (pixel) that corresponds to a nadir direction, and information indicating that this moving image is a VR image. The image processing unit 118 may record the image file of the VR still image in the storage medium 131 with a character string added to its file name, the character string indicating that this image file includes the VR image. For example, the file name of the VR moving image may include a three-character string ".vr" in front of the extension ".mp4", such as "123456.vr.mp4". These additions of the VR information and the character string indicating a VR image are not applied when a non-VR still image is captured.

The VR image will be described next. The VR image is an image that can be VR-displayed (displayed in a display mode "VR view"). For example, the VR image is an image in a celestial-sphere format, in which an individual direction from an imaging position can be associated with an individual position (an individual pixel). In the VR display, a part of the VR image is displayed as a display range. The display range can be freely changed in accordance with an instruction (operation) from the user, a change in the orientation of the display device that performs the VR display, or the like. In the VR display, a display is performed (a display range is determined or changed) such that the user can feel as if the user were in a virtual space (VR space) of the place where the image is captured (the user can get sense of realism and immersion). In other words, the VR display provides a display in which a view from the imaging position is reproduced so that the user can obtain feeling of overlooking every direction from the imaging position.

Example 1

Figure 4:
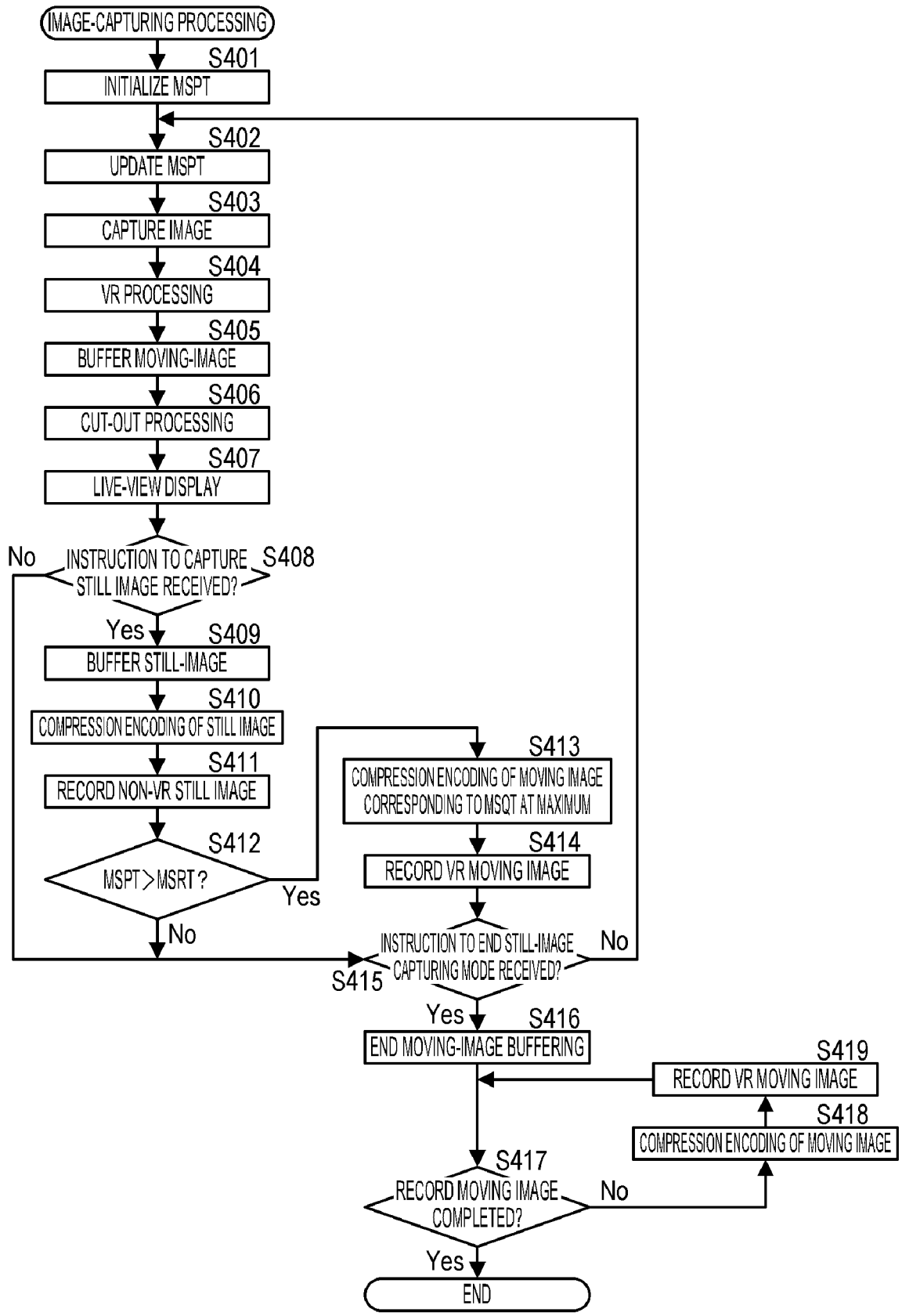
FIG. 4 is a flowchart illustrating an example of image-capturing processing according to example 1.

Example 1 of the present invention will be described. In example 1, a VR moving image up to a time position at which a non-VR still image is captured is recorded in the storage medium 131. FIG. 4 is a flowchart illustrating an example of image-capturing processing of the imaging apparatus 100. The image-capturing processing in FIG. 4 is realized by the camera control unit 120 that expands a program stored in the ROM 180 in the RAM 160 and executes the program. For example, the image-capturing processing in FIG. 4 starts in response that a still image capturing mode is set on the imaging apparatus 100. Of a plurality of processing steps in FIG. 4, processing steps performed by a constituent element other than the camera control unit 120 are performed in accordance with instructions from the camera control unit 120.

In step S401, the camera control unit 120 initializes an elapsed time MSPT from the start of the still image capturing mode to zero seconds.

In step S402, the camera control unit 120 updates the elapsed time MSPT. In step S403, the image sensors 102 and 112 perform image capturing. Next, the cut-out processing unit 301 acquires the image captured by the image sensor 102, and the VR processing unit 302 acquires the image captured by the image sensor 102 and the image captured by the image sensor 112. In step S404, by performing VR processing by using the two images acquired in step S403, the VR processing unit 302 generates a VR image (a 360-degree image). In step S405, the VR processing unit 302 stores the VR image obtained in step S404 in the memory 117 as a part of the VR moving image (moving-image buffering). While the moving image is being buffered, the VR moving image is temporarily stored in the memory 117. In step S406, the cut-out processing unit 301 extracts a partial range of the individual image acquired in step S403 (cut-out processing). In step S407, the display 141 displays the image extracted in step S406 (live-view display).

Step S404 may be performed after step S405 (before step S413 described below). Specifically, the VR processing unit 302 may directly store the two images captured by the image sensors 102 and 112 in the memory 117 (without performing the VR processing). Subsequently, the VR processing unit 302 may generate a VR image by reading out the two images stored in the memory 117 and performing the VR processing on the read-out images.

Step S407 performed for live-view display may be omitted. However, if the live-view display is performed, the user can capture an image at desired timing while checking the live-view display (the object). In addition, the user can check a brightness level, etc. of the live-view display and make an adjustment to obtain a desired imaging parameter so that the user can capture an image having a desired brightness level, etc. As described above, the live-view display may be performed on a separate device from the imaging apparatus 100 (an external device such as a smartphone or a tablet terminal connected to the imaging apparatus 100).

In step S408, the camera control unit 120 determines whether an instruction to capture a still image (an instruction to perform still-image capturing) has been received from the user. If the instruction to capture a still image has been received, the processing proceeds to step S409, and if not, the processing proceeds to step S415.

In step S409, the cut-out processing unit 301 stores the range of the image extracted in step S406 in the memory 107 as a non-VR still image (still-image buffering). In step S410, the image processing unit 108 performs compression encoding processing on the non-VR still image stored in the memory 107. In step S411, the image processing unit 108 generates a file of the non-VR still image obtained by the compression encoding processing in step S410 and records the file in the storage medium 131. For example, if the compression encoding processing is performed based on a JPEG format, the still-image file in the non-VR format can be reproduced by using a reproduction viewer corresponding to the JPEG format, there will be no need to use a reproduction viewer corresponding to the VR format.

In example 1, the range (the partial range of the captured image) to be recorded in the storage medium 131 is the same as the range of the live-view display. Alternatively, these ranges may be different from each other. However, if these ranges are the same, the user can capture a desired range of the still image that the user has checked on the live-view display. Thus, the user can capture a still image more comfortably.

In example 1, a minimum duration MSRT and a maximum duration MSQT of the VR moving image are previously determined. The minimum duration MSRT and the maximum duration MSQT are longer than zero seconds, and the maximum duration MSQT is longer than the minimum duration MSRT. For example, the minimum duration MSRT is 3 seconds or 5 seconds, and the maximum duration MSQT is 5 seconds or 10 seconds. The minimum duration MSRT may be previously determined by a manufacturer or the like, may be automatically determined in the imaging apparatus 100, or may be specified by the user. The minimum duration MSRT may be automatically or manually changeable. The same applies to the maximum duration MSQT.

In step S412, the camera control unit 120 determines whether the elapsed time MSPT is longer than the minimum duration MSRT. If the elapsed time MSPT is longer than the minimum duration MSRT, the processing proceeds to step S413, and if not, the processing proceeds to step S415.

In step S413, the image processing unit 118 sequentially reads out the VR image stored in the memory 117 and performs the compression encoding processing on the read-out VR image (compression encoding processing on the moving image). The compression encoding processing in step S413 is performed on the VR moving image for a duration of the elapsed time MSPT up to the time position at which the non-VR still image is captured (for example, the time position in the period from step S409 to step S413) or more and the maximum duration MSQT or less. For example, if the elapsed time MSPT is longer than the maximum duration MSQT, the image processing unit 118 reads out the VR moving image corresponding to the maximum duration MSQT and performs the compression encoding processing thereon. If the elapsed time MSPT is shorter than the maximum duration MSQT, the image processing unit 118 reads out the VR moving image corresponding to the elapsed time MSPT and performs the compression encoding processing thereon. In step S414, the image processing unit 118 records an image obtained by the compression encoding processing in step S413 in the storage medium 131 as a part (frame) of the VR moving image. Specifically, a file of the VR moving image including the image obtained by the compression encoding processing is generated in the storage medium 131 (creation of a new file). Subsequently, an image obtained by the compression encoding processing is sequentially stored in the existing file (updating of the file). In step S414, VR information may be stored in the file of the VR moving image, or a character string indicating that the file includes a VR image may be added to a file name of the VR moving image.

In step S415, the camera control unit 120 determines whether an instruction to end (cancel) the still-image capturing mode has been received from the user. If the instruction has been received, the processing proceeds to step S416, and if not, the processing proceeds to step S402.

In step S416, the VR processing unit 302 stops the moving-image buffering in step S405.

In step S417, the camera control unit 120 determines whether the recording of the VR moving image (the VR moving image for a duration of the elapsed time MSPT up to the time position at which the non-VR still image is captured or more and the maximum duration MSQT or less) into the storage medium 131 has been completed. If the recording has been completed, the image-capturing processing in FIG. 4 ends, and if not, the processing proceeds to step S418.

In step S418, as in step S413, the image processing unit 118 performs the compression encoding processing on the moving image. In step S419, as in step S414, the image processing unit 118 records an image obtained by the compression encoding processing in step S413 in the storage medium 131 as a part (frame) of the VR moving image. Steps S417 to S419 are repeated until the recording of the VR moving image is completed.

Figure 5:
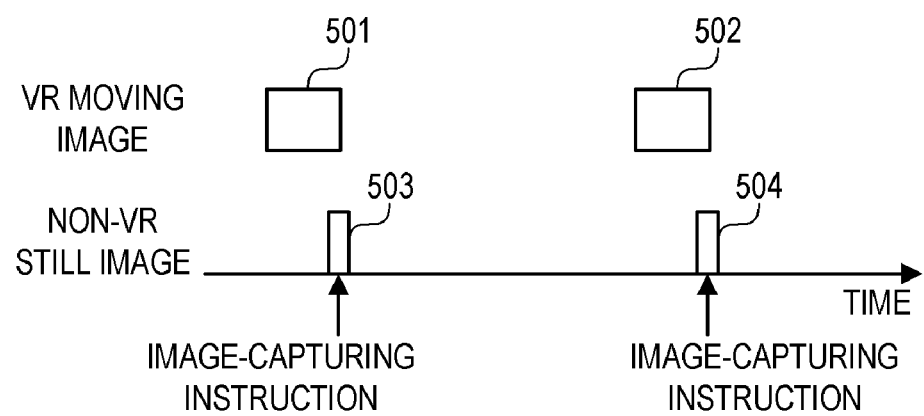
FIG. 5 illustrates an example of image capturing according to example 1.

FIG. 5 illustrates an example of image capturing (capturing of the non-VR still image and the VR moving image) according to the image-capturing processing in FIG. 4. The horizontal axis in FIG. 5 represents a lapse of time. In the image-capturing processing in FIG. 4, every time an instruction to capture a still image is issued, a non-VR still image is captured. When a plurality of non-VR still images is captured, each of the non-VR still images captured is recorded in the storage medium 131 as an individual file. In FIG. 5, the instruction to capture a still image has been issued twice. Accordingly, a file of the non-VR still image 503 and a file of the non-VR still image 504 are separately recorded in the storage medium 131. In addition, in the image-capturing processing in FIG. 4, every time a non-VR still image is captured, a VR moving image up to a time position at which the non-VR still image is captured is recorded as a file in the storage medium 131. If the elapsed time MSPT is longer than the maximum duration MSQT, a VR moving image corresponding to the maximum duration MSQT is recorded, and if the elapsed time MSPT is longer than the minimum duration MSRT and shorter than the maximum duration MSQT, a VR moving image corresponding to the elapsed time MSPT is recorded. If the elapsed time MSPT is shorter than the minimum duration MSRT, a VR moving image is not recorded. In FIG. 5, a file of a VR moving image 501 is recorded in the storage medium 131 in response to the capturing of the non-VR still image 503, and a file of a VR moving image 502 is recorded in the storage medium 131 in response to the capturing of the non-VR still image 504. Even when the instruction to capture the non-VR still image 504 is issued during the recording of the VR moving image 501, the file of the non-VR still image 503 and the file of the non-VR still image 504 are separately recorded, and also, the file of the VR moving image 501 and the file of the VR moving image 502 are separately recorded. When the files are recorded, the VR moving image 501 and the non-VR still image 503 may be recorded in the storage medium 131 in association with each other, and the VR moving image 502 and the non-VR still image 504 may be recorded in the storage medium 131 in association with each other. By doing so, the VR moving image and the non-VR still image that have captured the same object can easily be switched to be displayed as well as can easily be managed. Thus, the convenience is improved.

Example 2

Figure 6:
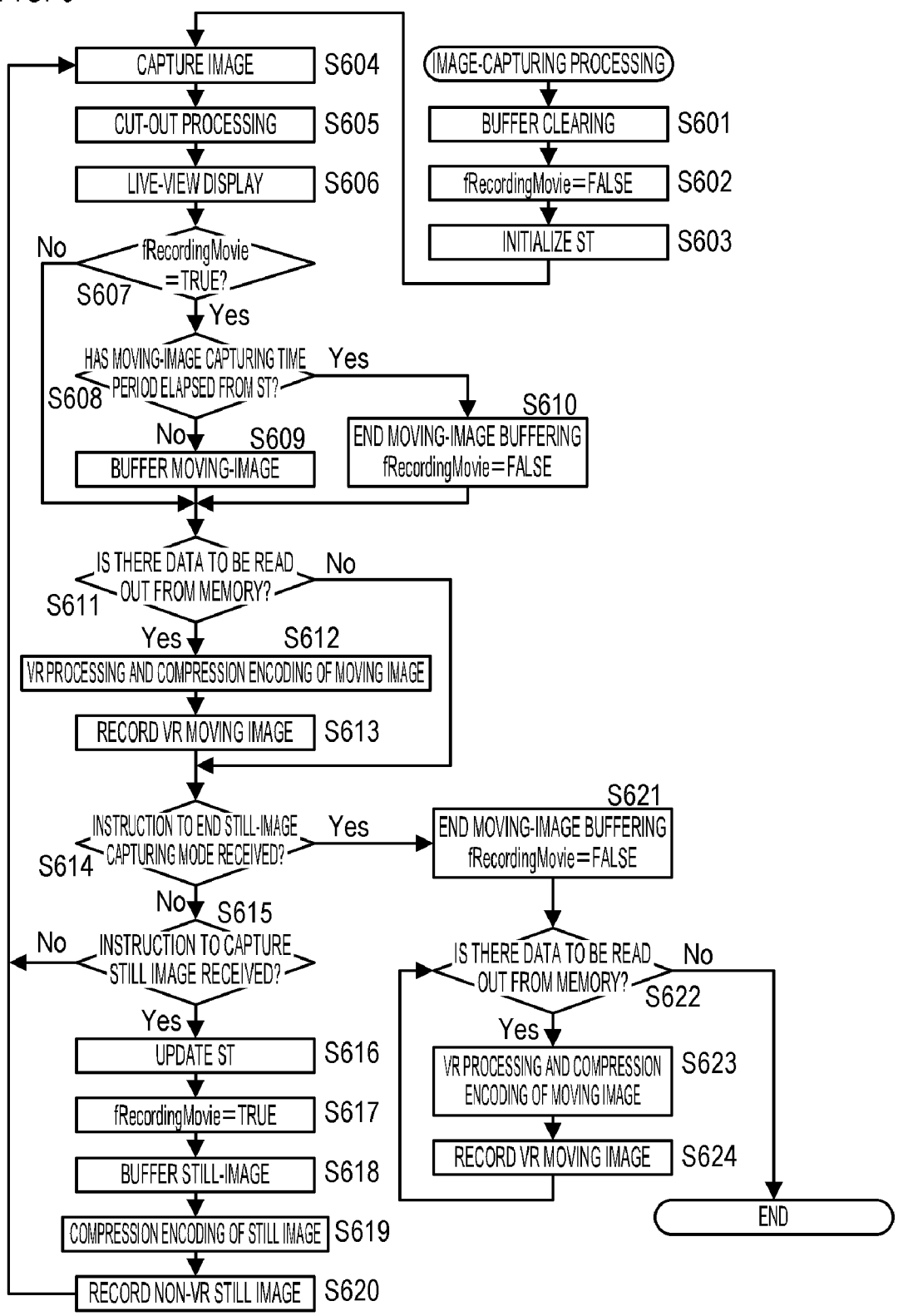
FIG. 6 is a flowchart illustrating an example of image-capturing processing according to example 2.

Example 2 of the present invention will be described. In example 2, a VR moving image from a time position at which a non-VR still image is captured is recorded in the storage medium 131. FIG. 6 is a flowchart illustrating an example of image-capturing processing of the imaging apparatus 100. The image-capturing processing in FIG. 6 is realized by the camera control unit 120 that expands a program stored in the ROM 180 in the RAM 160 and executes the program. For example, the image-capturing processing in FIG. 6 starts in response that a still image capturing mode is set on the imaging apparatus 100. Of a plurality of processing steps in FIG. 6, processing steps performed by a constituent element other than the camera control unit 120 are performed in accordance with instructions from the camera control unit 120.

In step S601, the camera control unit 120 deletes data recorded by buffering from the memories 107 and 117 (buffer clearing). In step S602, the camera control unit 120 sets a parameter FALSE which indicates that a moving image is not being recorded to a flag fRecordingMovie. In step S603, the camera control unit 120 initializes an image-capturing time ST of a still image to, for example, the start time of the still-image capturing mode.

In step S604, the image sensors 102 and 112 perform image capturing. Next, the cut-out processing unit 301 acquires the image captured by the image sensor 102, and the VR processing unit 302 acquires the image captured by the image sensor 102 and the image captured by the image sensor 112. In step S605, the cut-out processing unit 301 extracts a partial range of the individual image acquired in step S604 (cut-out processing). In step S606, the display 141 displays the image extracted in step S605 (live-view display).

In step S607, the camera control unit 120 determines whether a parameter TRUE which indicates that a moving image is being recorded is set to the flag fRecordingMovie. If the parameter TRUE is set, the processing proceeds to step S608, and if not, the processing proceeds to step S611.

In step S608, the camera control unit 120 determines whether an elapsed time from the image-capturing time ST of the still image has reached a predetermined moving-image capturing time period. If the moving-image capturing time period has been reached, the processing proceeds to step S610, and if not, the processing proceeds to step S609. The moving-image capturing time period is 3 seconds, 5 seconds, or 10 seconds, for example. The moving-image capturing time period may be previously determined by a manufacturer or the like, may be automatically determined in the imaging apparatus 100, or may be specified by the user. The moving-image capturing time period may be automatically or manually changeable.

In step S609, the VR processing unit 302 stores each of the two images acquired in step S604 (the two images captured by the image sensors 102 and 112) in the memory 117 as a part of the moving image (moving-image buffering).

In step S610, the VR processing unit 302 stops the moving-image buffering in step S609, and the camera control unit 120 sets a parameter FALSE to the flag fRecordingMovie.

In step S611, the camera control unit 120 determines whether data to be read out (at least a part of the moving image corresponding to the moving-image capturing time period from the image-capturing time ST of the still image) still remains in the memory 117. If the data to be read out still remains, the processing proceeds to step S612, and if not, the processing proceeds to step S614.

In step S612, the image processing unit 118 sequentially reads out the images stored in the memory 117 (reading-out of the moving images). Next, the image processing unit 118 performs VR processing by using the read-out images (the two images captured by the image sensors 102 and 112) (VR processing on the moving images) and performs compression encoding processing on a VR image obtained by the VR processing (compression encoding processing on the moving image). In step S613, the image processing unit 118 records an image obtained by the compression encoding processing in step S612 in the storage medium 131 as a part (frame) of the VR moving image.

In step S614, the camera control unit 120 determines whether an instruction to end (cancel) the still-image capturing mode has been received from the user. If the instruction has been received, the processing proceeds to step S621, and if not, the processing proceeds to step S615.

In step S615, the camera control unit 120 determines whether an instruction to capture a still image (an instruction to perform still-image capturing) has been received from the user. If the image-capturing instruction has been received, the processing proceeds to step S616, and if not, the processing proceeds to step S604.

In step S616, the camera control unit 120 updates the image-capturing time ST of the still image with the current time. In step S617, the camera control unit 120 sets a parameter TRUE to the flag fRecordingMovie. In step S618, the cut-out processing unit 301 stores the range of the image extracted in step S605 in the memory 107 as a non-VR still image (still-image buffering). In step S619, the image processing unit 108 performs the compression encoding processing on the non-VR still image stored in the memory 107. In step S620, the image processing unit 108 generates a file of the non-VR still image obtained by the compression encoding processing in step S619 and stores the file in the storage medium 131.

In step S621, the VR processing unit 302 stops the moving-image buffering in step S609, and the camera control unit 120 sets a parameter FALSE to the flag fRecordingMovie.

In step S622, as in step S611, the camera control unit 120 determines whether data to be read out still remains in the memory 117. If the data to be read out still remains, the processing proceeds to step S623, and if not, the image-capturing processing in FIG. 6 ends.

In step S623, as in step S612, the image processing unit 118 performs the reading-out of the moving images, the VR processing, and the compression encoding processing. In step S624, as in step S613, the image processing unit 118 records an image obtained by the compression encoding processing in step S623 in the storage medium 131 as a part (frame) of the VR moving image. Steps S622 to S624 are repeated until the reading-out of the data (recording of the VR moving image) from the memory 117 is completed.

Figure 7:
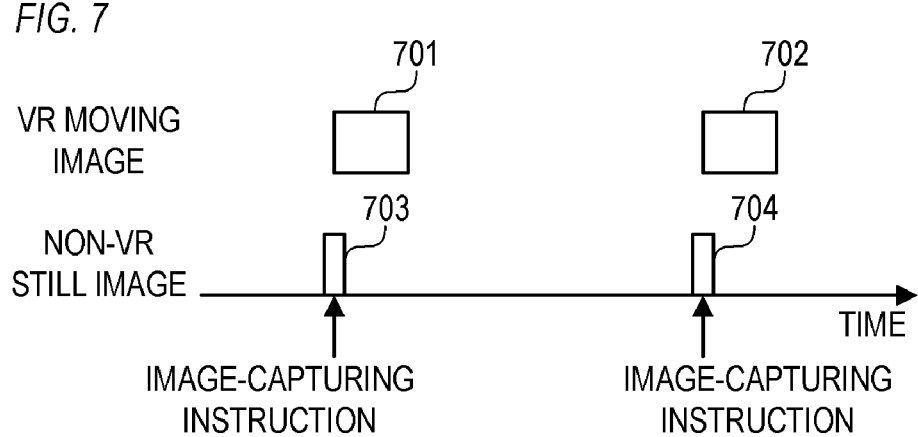
FIG. 7 illustrates an example of image capturing according to example 2.
Figure 8:
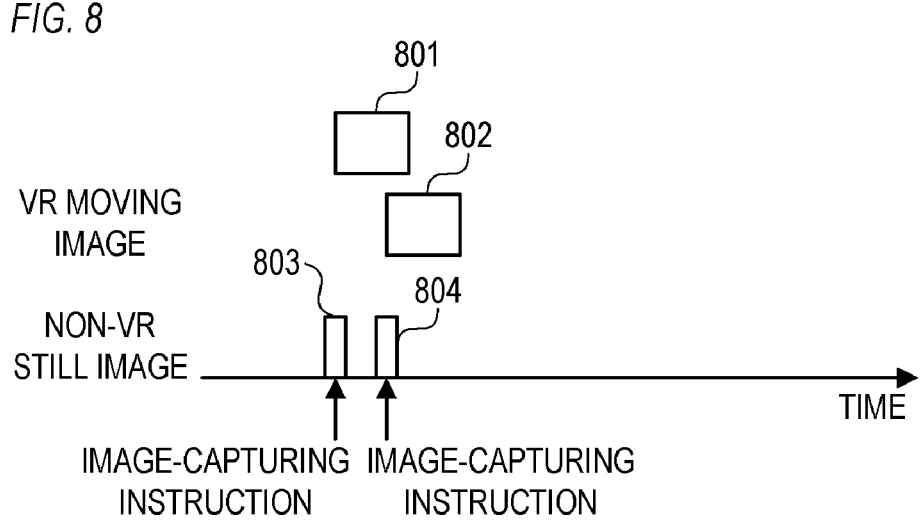
FIG. 8 illustrates an example of image capturing according to example 2.

FIGS. 7 and 8 illustrate examples of the image capturing (capturing of non-VR still images and VR moving images) according to the image-capturing processing in FIG. 6. The horizontal axis in each of FIGS. 7 and 8 represents a lapse of time. In the image-capturing processing in FIG. 6, every time an instruction to capture a still image is issued, a non-VR still image is captured. When a plurality of non-VR still images is captured, each of the non-VR still images is recorded in the storage medium 131 as an individual file. In FIG. 7, the instruction to capture a still image has been issued twice. Accordingly, a file of the non-VR still image 703 and a file of the non-VR still image 704 are separately recorded in the storage medium 131. In FIG. 8, too, the instruction to capture a still image has been issued twice. Accordingly, a file of the non-VR still image 803 and a file of the non-VR still image 804 are separately recorded in the storage medium 131.

In addition, in the image-capturing processing in FIG. 6, every time a non-VR still image is captured, a VR moving image corresponding to the moving-image capturing time period from a time position at which the non-VR still image is captured is recorded as a file in the storage medium 131.

In FIG. 7, a file of a VR moving image 701 is recorded in the storage medium 131 in response to the capturing of the non-VR still image 703, and a file of a VR moving image 702 is recorded in the storage medium 131 in response to the capturing of the non-VR still image 704.

However, if an instruction to capture a still image is issued while a VR moving image is being captured, the capturing of the VR moving image is cancelled, and a VR moving image is started to be captured from a time position at which a non-VR still image is captured last. In FIG. 8, capturing of a VR moving image 801 corresponding to the moving-image capturing time period from a time position at which the non-VR still image 803 is captured is cancelled, and only a file of a VR moving image 802 corresponding to the moving-image capturing time period from a time position at which the non-VR still image 804 is captured is recorded in the storage medium 131. When the file is recorded, the VR moving image 802 may be associated with only the non-VR still image 804 or may be associated with both the non-VR still image 803 and the non-VR still image 804.

Alternatively, in the case of FIG. 8, a file of the VR moving image 801 and a file of the VR moving image 802 may be recorded in the storage medium 131 without cancelling the capturing of the VR moving image 801. Instead of the file of the VR moving image 801 corresponding to the moving-image capturing time period, a file of a VR moving image for a duration from a time position at which the non-VR still image 803 is captured to a time position at which the non-VR still image 804 is captured may be recorded in the storage medium 131. The method for recording the VR moving image is changeable as appropriate.

Example 3

Figure 9:
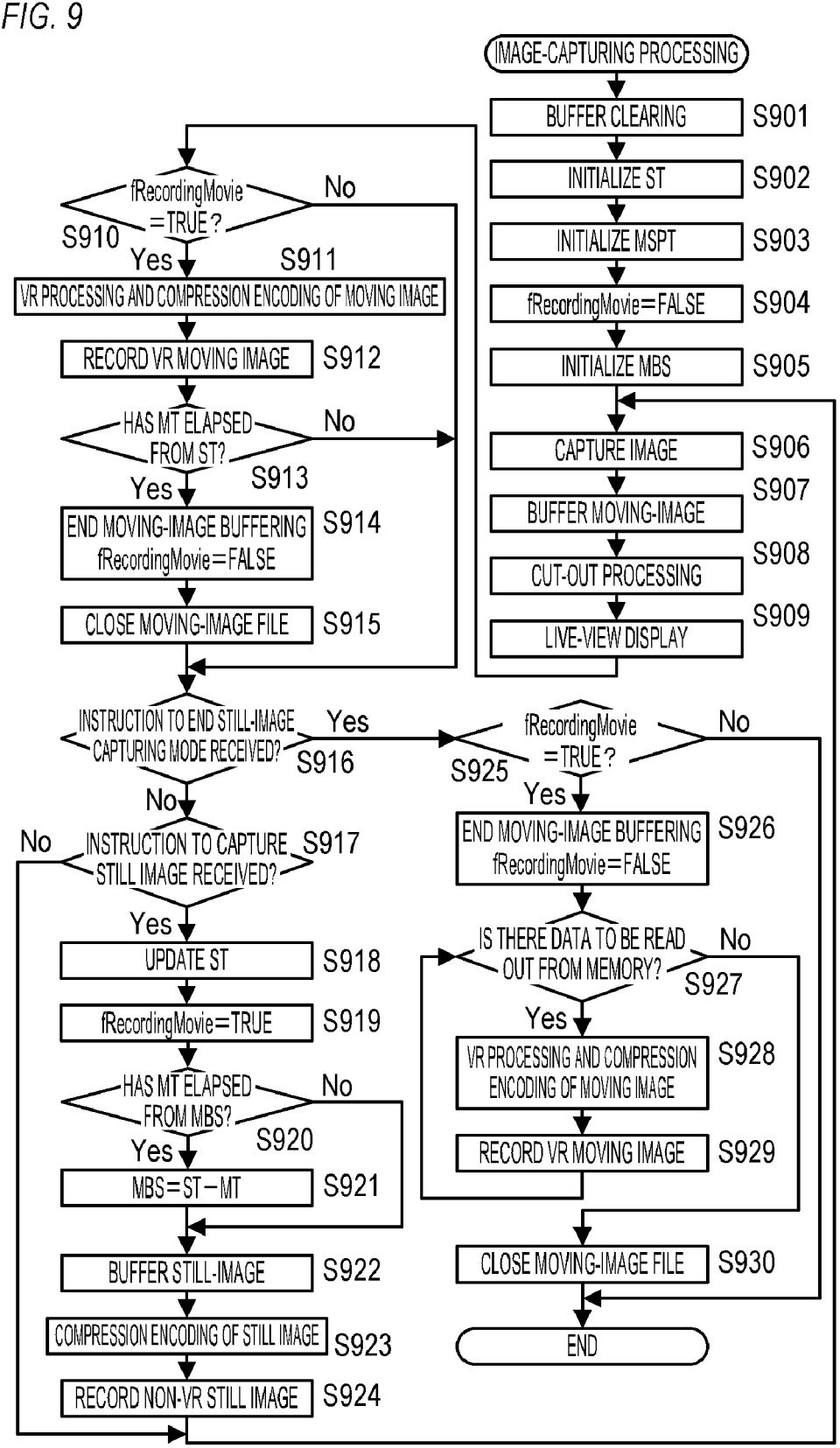
FIG. 9 is a flowchart illustrating an example of image-capturing processing according to example 3.

Example 3 of the present invention will be described. In example 3, a VR moving image for a duration from before a time position at which a non-VR still image is captured to after the time position is recorded in the storage medium 131. FIG. 9 is a flowchart illustrating an example of image-capturing processing of the imaging apparatus 100. The image-capturing processing in FIG. 9 is realized by the camera control unit 120 that expands a program stored in the ROM 180 in the RAM 160 and executes the program. For example, the image-capturing processing in FIG. 9 starts in response that a still image capturing mode is set on the imaging apparatus 100. Of a plurality of processing steps in FIG. 9, processing steps performed by a constituent element other than the camera control unit 120 are performed in accordance with instructions from the camera control unit 120.

In step S901, the camera control unit 120 deletes data recorded by buffering from the memories 107 and 117 (buffer clearing). In step S902, the camera control unit 120 initializes an image-capturing time ST of a still image to the start time of the still-image capturing mode. In step S903, the camera control unit 120 initializes an elapsed time MSPT from the start of the still image capturing mode to zero seconds. In step S904, the camera control unit 120 sets a parameter FALSE which indicates that a moving image is not being recorded to a flag fRecordingMovie. In step S905, the camera control unit 120 initializes a start time MBS of moving-image capturing to, for example, the start time of the still-image capturing mode.

In step S906, the image sensors 102 and 112 capture images. Next, the cut-out processing unit 301 acquires the image captured by the image sensor 102, and the VR processing unit 302 acquires the image captured by the image sensor 102 and the image captured by the image sensor 112. In step S907, the VR processing unit 302 stores each of the two images acquired in step S906 (the two images captured by the image sensors 102 and 112) in the memory 117 as a part of the moving image (moving-image buffering). In step S908, the cut-out processing unit 301 extracts a partial range of the individual image acquired in step S906 (cut-out processing). In step S909, the display 141 displays the image extracted in step S908 (live-view display).

In step S910, the camera control unit 120 determines whether a parameter TRUE which indicates that a moving image is being recorded is set to the flag fRecordingMovie. If the parameter TRUE is set, the processing proceeds to step S911, and if not, the processing proceeds to step S916.

In step S911, the image processing unit 118 sequentially reads out the images captured after the start time MBS of the moving-image capturing from the memory 117 (reading-out of the moving images). Next, the image processing unit 118 performs VR processing by using the read-out images (the two images captured by the image sensors 102 and 112) (VR processing on the moving images) and performs compression encoding processing on a VR image obtained by the VR processing (compression encoding processing on the moving image). In step S912, the image processing unit 118 records an image obtained by the compression encoding processing in step S911 in the storage medium 131 as a part (frame) of the VR moving image.

In step S913, the camera control unit 120 determines whether an elapsed time from the image-capturing time ST of the still image has reached a predetermined reference time period MT. If the reference time period MT has been reached, the processing proceeds to step S914, and if not, the processing proceeds to step S916. The reference time period MT is 3 seconds, 5 seconds, or 10 seconds, for example. The reference time period MT may be previously determined by a manufacturer or the like, may be automatically determined in the imaging apparatus 100, or may be specified by the user. The reference time period MT may be automatically or manually changeable.

In step S914, the VR processing unit 302 stops the moving-image buffering in step S907, and the camera control unit 120 sets a parameter FALSE to the flag fRecordingMovie. In step S915, the VR processing unit 302 closes the file of the VR moving image recorded in the storage medium 131 in step S912.

In step S916, the camera control unit 120 determines whether an instruction to end (cancel) the still-image capturing mode has been received from the user. If the instruction has been received, the processing proceeds to step S925, and if not, the processing proceeds to step S917.

In step S917, the camera control unit 120 determines whether an instruction to capture a still image (an instruction to perform still-image capturing) has been received from the user. If the image-capturing instruction has been received, the processing proceeds to step S918, and if not, the processing proceeds to step S906.

In step S918, the camera control unit 120 updates the image-capturing time ST of the still image with the current time. In step S919, the camera control unit 120 sets a parameter TRUE to the flag fRecordingMovie.

In step S920, the camera control unit 120 determines whether an elapsed time from the start time MBS of the moving-image capturing has reached a predetermined reference time period MT. If the reference time period MT has been reached, the processing proceeds to step S921, and if not, the processing proceeds to step S922. The start time MBS is a set value, and a moving-image capturing is not necessarily performed at the time in step S920. For example, when step S920 is performed for the first time, the start time MBS of the moving-image capturing is set to the start time of the still-image capturing mode (the initial value).

In step S921, the camera control unit 120 updates the start time MBS of the moving-image capturing with a time that is the reference time period MT before the image-capturing time ST of the still image.

In step S922, the cut-out processing unit 301 stores the range of the image extracted in step S908 in the memory 107 as a non-VR still image (still-image buffering). In step S923, the image processing unit 108 performs compression encoding processing on the non-VR still image stored in the memory 107. In step S924, the image processing unit 108 records (generates) a file of the non-VR still image obtained by the compression encoding processing in step S923 in the storage medium 131.

In step S925, the camera control unit 120 determines whether a parameter TRUE is set to the flag fRecordingMovie. If the parameter TRUE is set, the processing proceeds to step S926, and if not, the image-capturing processing in FIG. 9 ends.

In step S926, the VR processing unit 302 stops the moving-image buffering in step S907, and the camera control unit 120 sets a parameter FALSE to the flag fRecordingMovie.

In step S927, the camera control unit 120 determines whether data to be read out (at least a part of the moving image captured after the start time MBS of the moving-image capturing) still remains in the memory 117. If the data to be read out still remains, the processing proceeds to step S928, and if not, the processing proceeds to step S930.

In step S928, as in step S911, the image processing unit 118 performs the reading-out of the moving images, the VR processing, and the compression encoding processing. In step S929, as in step S912, the image processing unit 118 records an image obtained by the compression encoding processing in step S928 in the storage medium 131 as a part (frame) of the VR moving image. Steps S927 to S929 are repeated until the reading-out of the data (recording of the VR moving image) from the memory 117 is completed.

In step S930, the VR processing unit 302 closes the file of the VR moving image recorded in the storage medium 131 in step S929.

Figure 10:
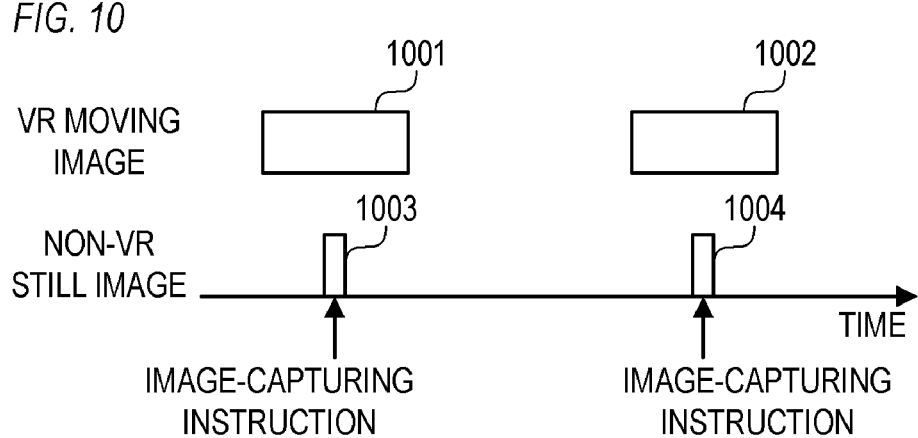
FIG. 10 illustrates an example of image capturing according to example 3.
Figure 11:
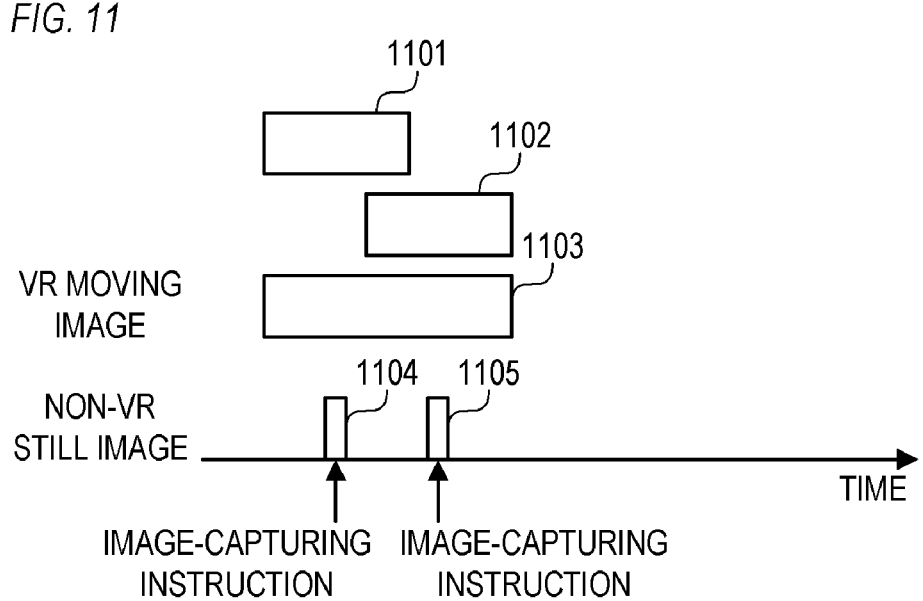
FIG. 11 illustrates an example of image capturing according to example 3.

FIGS. 10 and 11 illustrate examples of image capturing (capturing of non-VR still images and VR moving images) of the image-capturing processing in FIG. 9. The horizontal axis in each of FIGS. 10 and 11 represents a lapse of time. In the image-capturing processing in FIG. 9, every time an instruction to capture a still image is issued, a non-VR still image is captured. When a plurality of non-VR still images is captured, each of the non-VR still images is recorded in the storage medium 131 as an individual file. In FIG. 10, the instruction to capture a still image has been issued twice. Accordingly, a file of the non-VR still image 1003 and a file of the non-VR still image 1004 are separately recorded in the storage medium 131. In FIG. 11, too, the instruction to capture a still image has been issued twice. Accordingly, a file of the non-VR still image 1104 and a file of the non-VR still image 1105 are separately recorded in the storage medium 131.

In addition, in the image-capturing processing in FIG. 9, every time the non-VR still image is captured, a VR moving image is captured for a duration from a time MBS as a start time to a time that is the reference time period MT after the image-capturing time ST of the non-VR still image as an end time. Hereinafter, an image-capturing time period from a time MBS as a start time to a time that is the reference time period MT after the image-capturing time ST of the non-VR still image as an end time is referred to as a "basic image-capturing time period". In the image-capturing processing in FIG. 9, for example, a file of a VR moving image for a duration from a time that is the reference time period MT before an image-capturing time ST to a time that is the reference time period MT after the image-capturing time ST is recorded in the storage medium 131 as a file of the VR moving image for a basic image-capturing time period. In FIG. 10, a file of a VR moving image 1001 is recorded in the storage medium 131 in response to the capturing of the non-VR still image 1003, and a file of a VR moving image 1002 is recorded in the storage medium 131 in response to the capturing of the non-VR still image 1004.

However, if the basic image-capturing time period of a VR moving image overlaps the basic image-capturing time period of another VR moving image, the plurality of basic image-capturing time periods overlapping with each other is synthesized into one image-capturing time period, and one VR moving image is captured for the one image-capturing time period, rather than that VR moving images are captured for the respective basic image-capturing time periods. In FIG. 11, the basic image-capturing time period of the VR moving image 1101 corresponding to the capturing of the non-VR still image 1104 and the basic image-capturing time period of the VR moving image 1102 corresponding to the capturing of the non-VR still image 1105 overlap with each other. Accordingly, only a file of a VR moving image 1103 for an image-capturing time period from the start time of the basic image-capturing time period of the VR moving image 1101 to the end time of the basic image-capturing time period of the VR moving image 1102 is recorded in the storage medium 131. When the file is recorded, the VR moving image 1103 may be associated with only the non-VR still image 1105 or may be associated with both the non-VR still image 1104 and the non-VR still image 1105.

Alternatively, in the case of FIG. 11, instead of recording the file of the VR moving image 1103 in the storage medium 131, a file of the VR moving image 1101 and a file of the VR moving image 1102 may be recorded in the storage medium 131. Instead of the file of the VR moving image 1101, a file of a VR moving image for an image-capturing time period from the start time of the basic image-capturing time period of the VR moving image 1101 to the start time of the basic image-capturing time period of the VR moving image 1102 may be recorded in the storage medium 131. Instead of the file of the VR moving image 1102, a file of a VR moving image for an image-capturing time period from the end time of the basic image-capturing time period of the VR moving image 1101 to the end time of the basic image-capturing time period of the VR moving image 1102 may be recorded in the storage medium 131. The method for recording the VR moving image is changeable as appropriate.

As described above, according to the present embodiment (including examples 1 to 3), both a non-VR still image (a still image with a normal field angle) and a VR moving image can be captured. While the present embodiment has been described with the example in which the VR moving image is a 360-degree image, the filed angle of the VR moving image may be smaller than 360 degrees or smaller than 180 degrees. However, the field angle of the VR moving image is wider than that of the non-VR still image.

In addition, while the present embodiment has been described with the example in which the VR moving image is obtained by using the two image sensors 102 and 112, a VR moving image may be generated from an image captured by a single image sensor, and the imaging apparatus 100 may include only one image sensor. Alternatively, a plurality of images may be captured by using three or more image sensors, and the VR processing may be performed on the captured images to generate a VR moving image. In addition, instead of a non-VR still image, a VR still image (a still image which is a VR image) may be generated. However, in the present embodiment, the field angle of the still image is smaller than that of the moving image.

In addition, the various kinds of control operations, which have been described above to be performed by the camera control unit 120, may be performed by a single hardware unit, or alternatively, a plurality of hardware units (for example, a plurality of processors or circuits) may share the processing and control the entire apparatus.

While the present invention has been described in detail based on the preferred embodiment, the present invention is not limited to this specific embodiment, and various modes are included in the present invention without departing from the gist of the present invention. The embodiment described above is merely an exemplary embodiment of the present invention, and it is also possible to combine the embodiment with another embodiment as appropriate.

While the above embodiment has been described with the exemplary case where the present invention is applied to the digital camera, the present invention is not limited to this exemplary case and is applicable to any apparatus (electronic device) capable of acquiring a captured image. For example, the present invention is applicable to a personal computer, a PDA, a mobile phone terminal, a portable image viewer, a printer, a digital photo frame, a music player, a game machine, an electronic book reader, a video player, and the like. The present invention is also applicable to a television device, a projection device, a tablet terminal, a smartphone, an AI speaker, a household electric appliance, an on-vehicle device, medical equipment, and the like.

In addition, the present invention is applicable not only to an imaging apparatus itself but also to a control apparatus that communicates with an imaging apparatus (including a network camera) via wired or wireless communication and remotely controls the imaging apparatus. Examples of the apparatus that remotely controls the imaging apparatus include a smartphone, a tablet PC, and a desktop PC. On the basis of operations and processing performed on the control apparatus side, the control apparatus can remotely control the imaging apparatus by notifying the imaging apparatus of a command that causes the imaging apparatus to perform various operations and settings. Alternatively, the control apparatus may receive a live-view image captured by the imaging apparatus via wired or wireless communication and display the received live-view image on the control apparatus side.

According to the present disclosure, both a VR image and an image with a normal field angle can be captured.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-091446, filed on May 14, 2019, which is hereby incorporated by reference herein in its entirety.

What is claimed is:

1. An electronic apparatus comprising at least one memory and at least one processor which function as:
   an acquisition unit configured to acquire an image by using at least one of a plurality of optical systems; and
   a control unit configured to perform control to record a still image which includes the acquired image in a storage based on receiving a user control to capture a still image, and perform control to record a moving image including a plurality of acquired images in chronological order in the storage based on timing of acquiring the image included in the still image, the moving image being acquired by using at least two of the plurality of optical systems and including the plurality of images acquired in a predetermined time period at least one of before and after acquiring the image included in the still image,
   wherein a field of view of the moving image is wider than that of the still image.

2. The electronic apparatus according to claim 1, wherein the control unit performs control to extract a part of the acquired image, and
   the still image corresponds to the extracted part of the acquired image.

3. The electronic apparatus according to claim 1, wherein the control unit
   performs control to execute image processing for obtaining a moving image in a celestial-sphere format to the plurality of acquired images and record the moving image in the storage, and
   performs control to record the still image in the storage without executing the image processing to the acquired image.

4. The electronic apparatus according to claim 1, wherein the control unit
   performs control to record an image file of the moving image in the storage with including VR information for associating each direction from a position where image acquiring is performed with each position in the moving image, and
   performs control to record an image file of the still image in the storage without including the VR information.

5. The electronic apparatus according to claim 4, wherein the control unit
   performs control to record an image file of the moving image in the storage with including a character string in a file name, the character string indicating that the moving image is the VR image, and
   performs control to record an image file of the still image in the storage without including the character string in a file name.

6. The electronic apparatus according to claim 1, wherein the still image is not a VR image and the moving image is the VR image,
   the VR image is a celestial-sphere image or a half-celestial-sphere image.

7. The electronic apparatus according to claim 1, wherein the control unit performs control to record, in the storage, the still image and the moving image in association with each other.

8. The electronic apparatus according to claim 1, wherein the moving image is a 360-degree image or a 180-degree image.

9. The electronic apparatus according to claim 1, wherein the at least one memory and at least one processor further function as: a display control unit configured to perform control to display a part of the acquired image on a display, and
   the still image corresponds to the displayed part of the acquired image.

10. The electronic apparatus according to claim 1, wherein the electronic apparatus is a imaging apparatus.

11. The electronic apparatus according to claim 1, wherein
   the control unit performs control to synthesize a plurality of images acquired by using each of at least two of the plurality of optical systems, and
   the moving image includes a plurality of synthesized images, in chronological order.

12. The electronic apparatus according to claim 1, wherein
   the control unit
   performs control to synthesize a plurality of images acquired by using each of at least two of the plurality of optical systems, and
   performs control to extract a part of the synthesized image, and
   the still image corresponds to the extracted part of the synthesized image.

13. The electronic apparatus according to claim 1, wherein the control unit performs control to record the still image and the moving image in the storage after executing encoding processing to the still image and the moving image respectively.

14. The electronic apparatus according to claim 1, wherein the acquisition unit acquires the image by using at least one of a plurality of image sensors corresponding to at least one of the plurality of optical systems.

15. The electronic apparatus according to claim 1, wherein the control unit performs control to record, in the storage, the moving image in association with at least one of information indicating a position that corresponds to a zenith direction and information indicating a position that corresponds to a nadir direction.

16. The electronic apparatus of claim 1, wherein the plurality of images for the moving image are acquired and stored in a memory regardless of timing of acquiring the image included in the still image, and some of the plurality of images for the moving image acquired and stored in the memory at least one time period before and another time period after the timing of acquiring the image included in the still image are recorded in the storage.

17. A control method of an electronic apparatus, comprising:

acquiring an image by using at least one of a plurality of optical systems;

performing control to record a still image which includes the acquired image in a storage based on receiving a user control to capture a still image; and performing control to record a moving image including a plurality of acquired images in chronological order in the storage based on timing of acquiring the image included in the still image, the moving image being acquired by using at least two of the plurality of optical systems and including the plurality of images acquired in a predetermined time period at least one of before and after acquiring the image included in the still image, wherein a field of view of the moving image is wider than that of the still image.

18. A non-transitory computer readable medium that stores a program, wherein the program causes a computer to execute a control method of an electronic apparatus, and the control method includes:

acquiring an image by using at least one of a plurality of optical systems;

performing control to record a still image which includes the acquired image in a storage based on receiving a user control to capture a still image; and performing control to record a moving image including a plurality of acquired images in chronological order in the storage based on timing of acquiring the image included in the still image, the moving image being acquired by using at least two of the plurality of optical systems and including the plurality of images acquired in a predetermined time period at least one of before and after acquiring the image included in the still image, wherein a field of view of the moving image is wider than that of the still image.

* * * * *